E. H. GOLD.
HOSE COUPLING.
APPLICATION FILED SEPT. 12, 1913.

1,118,123. Patented Nov. 24, 1914.

WITNESSES:

INVENTOR.

ATTORNEYS.

UNITED STATES PATENT OFFICE.

EGBERT H. GOLD, OF CHICAGO, ILLINOIS.

HOSE-COUPLING.

1,118,123.  Specification of Letters Patent.  Patented Nov. 24, 1914.

Application filed September 12, 1913. Serial No. 789,572.

*To all whom it may concern:*

Be it known that I, EGBERT H. GOLD, a citizen of the United States, residing at Chicago, in the county of Cook and State of Illinois, have invented certain new and useful Improvements in Hose-Couplings, of which the following is a specification.

My invention relates to hose couplings and particularly to hose couplings used for connecting the sections of pipe constituting the train lines in railway car heating systems.

The object of the invention is to provide certain devices and arrangements for making a steam tight joint between the mating elements of a hose coupling to take the place of the usual gaskets employed for this purpose.

The invention provides, at a reduced or at least no greater cost, a substitute for the customary expansible gasket which is more durable and effective and, for other reasons, more convenient and desirable than such gaskets.

The invention is illustrated, in a preferred embodiment, in the accompanying drawing, wherein—

Figure 1:
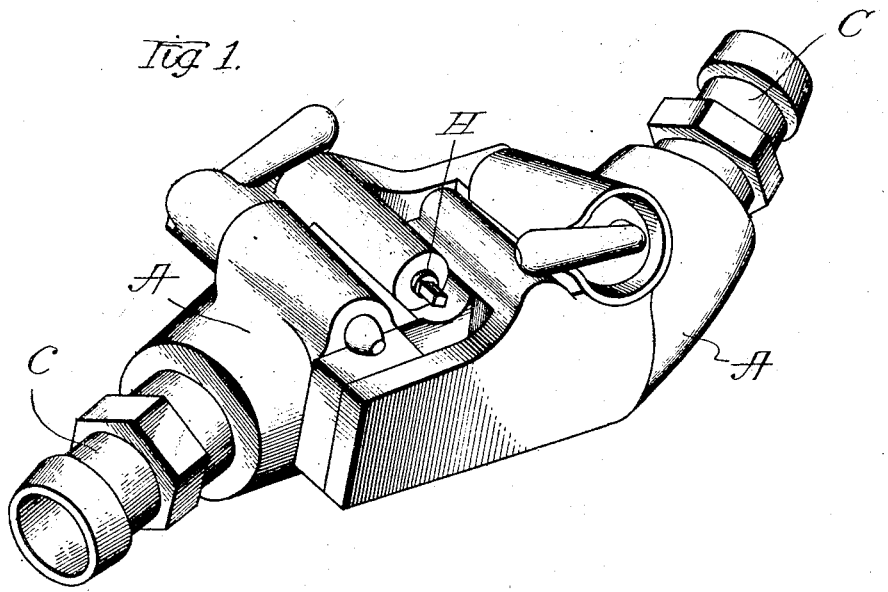
Figure 2:
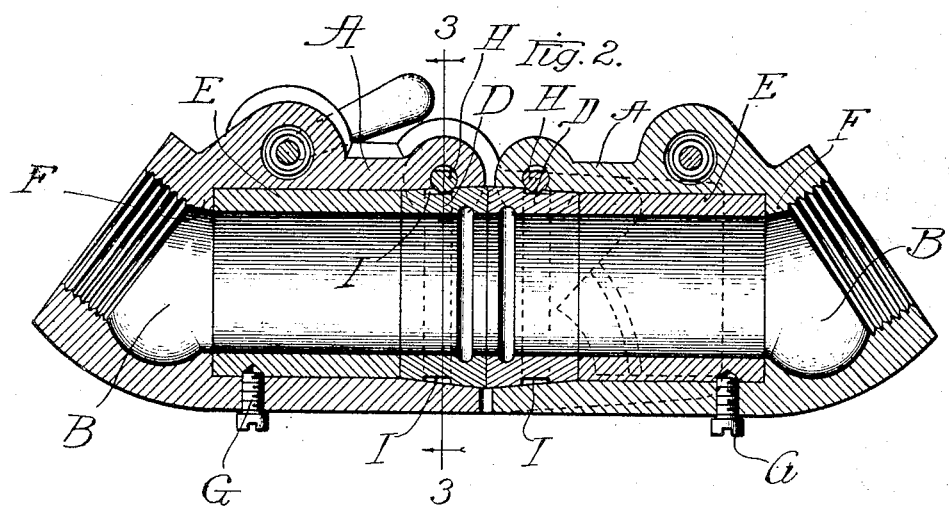
Figure 3:
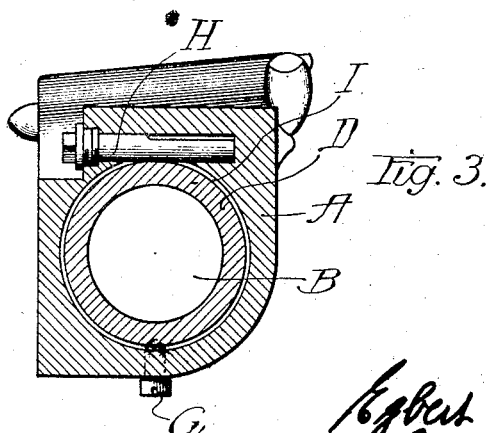

Figure 1 shows, in perspective, a common form of hose coupling for coupling together the sections of pipe in the train line of a railway car heating system; Fig. 2, a longitudinal sectional view of said coupling, and Fig. 3, a sectional view on line 3—3 of Fig. 2.

Like characters of reference designate like parts in the several figures of the drawing.

The novel gasket arrangements constituting my invention are shown in connection with a common type of hose coupling. It will be obvious, however, that the invention is not limited to this particular coupling. The coupling shown for the purpose of illustrating the application of the invention consists of a pair of mating coupler heads A, A, formed with ports or ducts B, B, extending therethrough and provided with nipples C, C, to which the hoses are attached. The heads are provided with suitable interlocking devices which are not detailed as they form no part of the present invention. It has been customary, in hose couplings of this general sort, to employ gaskets made of certain rubber compositions having considerable capacity for expansion upon an increase of temperature. When the steam is turned into the train pipe and comes in contact with the gaskets, which are preferably made quite long, they expand in the direction of the length of the steam ports of the coupling and by pressing one against the other, provide a steam tight joint between the mating elements of the coupling. One of the disadvantages in employing a gasket of this sort is that as it is made necessarily of rather soft material the edge of which seats against the gasket in the mating coupler head is likely to be chafed, frayed or otherwise injured either in the operation of bringing the coupler heads together, or from other causes. Any breaking, wearing away, fraying, or other similar injury to the seating edge of the gasket, if at all serious, makes it incapable of forming a steam tight connection with the gasket of the other coupler head so that as a matter of practice gaskets of this sort have to be frequently replaced; which is a matter of inconvenience and also of considerable expense. My invention overcomes this objection in the following manner: The gasket proper, designated D, is made relatively short and, while it may be made of the ordinary material now used for gaskets, is preferably composed of some harder, tougher material. For example, the gasket may be composed of metal. Arranged back of the gasket D is a cylindrical member E made of some material having a relatively high degree of expansibility when subjected to the temperature of steam. For example, it may be composed of the material heretofore used for making expansible gaskets commonly known as "Jenkins material." This expansible member is preferably seated against a shoulder F formed on the inside of the coupler head and may be held in position by the set screw G or other suitable means.

The inner end face of the expansible member and the face of shoulder F, likewise the abutting end faces of the gasket and the expansible member, are formed in planes at right angles to the axis of the port of the coupler head so that the thrust of the expansible member under the influence of steam is imparted directly in longitudinal lines to the gasket. The expansible member and the gasket both fit the bore through the coupler head so that a straight, unobstructed passageway for the steam is formed thereby which is a material consideration in view of the fact that a railway steam train line is never free from scale, dirt and other foreign substances which are likely to be intercepted by an obstructing part of the coupling, if there be any. When the expansible member is under the influence of steam there is no possibility of leakage at any point in the steam port.

For keeping the gasket D from falling out of the coupler head I have shown the latter provided with a common form of gasket retaining bolt H. The usual groove in the gasket is widened a trifle, as indicated at I, so that the gasket can move outwardly when pressed against by the expansion of the member E. It will be seen that this arrangement permits the gasket proper, that is, the element which, by seating against a like element in the mating coupler head, provides the steam tight joint, to be made of tougher, harder and less expensive material than the composition customarily used for making the gaskets of train pipe couplings. Even if the gasket is made of soft material, an economy is effected by my improved arrangement since by making the gasket smaller, that is, shorter, than has been the practice, the cost of replacement is diminished.

While I have shown and described my invention in a preferred embodiment, it will be readily understood that modifications might be made without departure from the principle of the invention. Therefore I do not wish to have the invention considered as limited to the specific construction, arrangement and proportion of parts shown.

I claim:

1. The combination with one of the mating heads of a hose coupling having a port therethrough formed with a shoulder, of a tubular member made of material which expands appreciably when subjected to the temperature of steam and is fitted into the port of said coupler head bearing against said shoulder, and a gasket in the outer end of said port bearing against the end of said expansible member; the abutting end faces of said gasket and expansible member being in a plane at right angles to the axis of said port so that the thrust of the expansible element under the influence of steam is imparted in longitudinal lines to the gasket.

2. The combination with one of the mating heads of a hose coupling having a port therethrough formed with a shoulder, of a tubular member made of material which expands appreciably when subjected to the temperature of steam and is fitted into the port of said coupler head bearing against said shoulder, a gasket in the outer end of said port bearing against the end of said expansible member; the abutting end faces of said gasket and expansible member being in a plane at right angles to the axis of said port so that the thrust of the expansible element under the influence of steam is imparted in longitudinal lines to the gasket, and means for separately retaining said expansible member and gasket in place in said port.

3. The combination with one of the mating heads of a hose coupling having a port therethrough formed with a shoulder, of a tubular member made of rubber composition which expands appreciably when subjected to the temperature of steam and is fitted into the port of said coupler head bearing against said shoulder, and a metal gasket in the outer end of said port bearing against the end of said expansible member; the abutting end faces of said gasket and expansible member being in a plane at right angles to the axis of said port so that the thrust of the expansible element under the influence of steam is imparted in longitudinal lines to the gasket.

EGBERT H. GOLD.

Witnesses:
L. A. FALKENBERG,
G. Y. SKINNER.

It is hereby certified that in Letters Patent No. 1,118,123, granted November 24, 1914, upon the application of Egbert H. Gold, of Chicago, Illinois, for an improvement in "Hose-Couplings," an error appears in the printed specification requiring correction as follows: Page 1, line 67, strike out the word "of"; and that the said Letters Patent should be read with this correction therein that the same may conform to the record of the case in the Patent Office.

Signed and sealed this 19th day of January A. D., 1915.

[SEAL.]

R. F. WHITEHEAD,
*Acting Commissioner of Patents.*